United States Patent
Jahan et al.

(10) Patent No.: US 8,094,732 B2
(45) Date of Patent: Jan. 10, 2012

(54) METHOD AND DEVICE FOR ESTIMATING A MULTICARRIER SIGNAL PROPAGATION CHANNEL

(75) Inventors: Bruno Jahan, Tinteniac (FR); Pierrick Louin, Rennes (FR)

(73) Assignee: TDF, Paris Cedex (FR)

( * ) Notice: Subject to any disclaimer, the term of this patent is extended or adjusted under 35 U.S.C. 154(b) by 846 days.

(21) Appl. No.: 10/564,866

(22) PCT Filed: Jul. 16, 2004

(86) PCT No.: PCT/FR2004/001900
§ 371 (c)(1),
(2), (4) Date: Jul. 6, 2006

(87) PCT Pub. No.: WO2005/011144
PCT Pub. Date: Feb. 3, 2005

(65) Prior Publication Data
US 2007/0041456 A1     Feb. 22, 2007

(30) Foreign Application Priority Data
Jul. 18, 2003 (FR) ..................... 03 08844

(51) Int. Cl.
*H04K 1/10* (2006.01)
*H04L 27/28* (2006.01)
(52) U.S. Cl. ..................................... 375/260
(58) Field of Classification Search ........... 375/340, 375/260
See application file for complete search history.

(56) References Cited

U.S. PATENT DOCUMENTS

| 6,369,857 B1 * | 4/2002 | Balaban et al. | 348/555 |
| 2003/0086508 A1 * | 5/2003 | Magee | 375/340 |
| 2003/0108127 A1 * | 6/2003 | Eilts et al. | 375/340 |
| 2003/0112265 A1 * | 6/2003 | Zhang | 345/723 |

FOREIGN PATENT DOCUMENTS

| EP | 0 762 703 A1 | 3/1997 |
| EP | 1 320 232 A2 | 6/2003 |
| EP | 1542384 A1 * | 6/2005 |

OTHER PUBLICATIONS

International Preliminary Report on Patentability dated Jan. 20, 2005 for corresponding International Application No. PCT/FR/2004/001900, filed Jul. 16, 2004.
International Search Report dated Jan. 14, 2005 for corresponding International Application No. PCT/FR2004/001900, filed Jul. 16, 2004.

* cited by examiner

*Primary Examiner* — David C. Payne
*Assistant Examiner* — Tanmay Shah
(74) *Attorney, Agent, or Firm* — David D. Brush; Westman, Champlin & Kelly, P.A.

(57) ABSTRACT

A method is provided for estimating a propagation channel composed of successive symbols of a multicarrier signal, each comprising at least one reference pilot and a plurality of data-carrying frequencies. Such a method comprises, in particular, at least one step consisting of correcting the at least one reference pilot on the basis of a first estimation of a propagation channel, in order to provide a second, more precise estimation of the channel.

14 Claims, 4 Drawing Sheets

US 8,094,732 B2

METHOD AND DEVICE FOR ESTIMATING A MULTICARRIER SIGNAL PROPAGATION CHANNEL

CROSS-REFERENCE TO RELATED APPLICATION

This Application is a Section 371 National Stage Application of International Application No. PCT/FR2004/001900, filed Jul. 16, 2004 and published as WO 2005/011144 on Feb. 3, 2005, not in English.

FIELD OF THE DISCLOSURE

The field of the disclosure is applied digital communications, digital radio broadcasting systems of the type belonging to the group including DAB, DVB-T, DRM, and also telecommunications (ADSL, Hyperlan2, etc.).

More precisely, the disclosure relates to DAB, DVB-T, DRM type receivers that use the OFDM (Orthogonal Frequency Division Multiplex) demodulation, which is used increasingly in the above-mentioned fields.

BACKGROUND OF THE DISCLOSURE

OFDM modulation consists of distributing data with duration Tu (called the useful symbol time) in the time-frequency space on a plurality of independently modulated carrier frequencies, for example in QPSK or QAM. OFDM thus decomposes the channel into cells along the time axis 11 and the frequency axis 12 as shown in FIG. 1. Each of the carriers is orthogonal to the previous carrier.

The channel with predetermined length 13 is thus composed of a sequence of frequency sub-bands 14 and a sequence of time segments 15.

A dedicated carrier is assigned to each frequency/time cell. Therefore, information to be transported will be distributed on all these carriers, each modulated at low flow for example, by a QPSK or QAM type modulation. An OFDM symbol includes all information carried by all carriers at time t.

This modulation technique is particularly efficient in situations in which multi-paths are encountered. As shown in FIG. 2 that presents a set of OFDM symbols 21, the same sequence of symbols arriving at a receiver by two different paths is like the same information arriving at two different and additive instants. These echoes cause two types of defects:
intra symbol interference: addition of a symbol with itself slightly out-of-phase;
inter symbol interference: addition of a symbol with the next symbol plus the previous symbol slightly out of phase.

A "dead" zone called the guard interval 22 is inserted between each transmitted symbol, the duration 23 of which is chosen to be sufficiently large with respect to spreading of echoes. These precautions will limit inter symbol interference (which is absorbed by the guard interval).

On reception, carriers are also affected by either an attenuation (destructive echoes) or amplification (constructive echoes) and/or phase rotation.

Pilot synchronisation carriers (often with an amplitude greater than useful data carriers) are inserted to calculate the channel transfer function and thus equalize the signal before demodulation. The value and location of these pilots in the time/frequency space are predefined and known to the receivers.

After interpolation in time and in frequency, a more or less relevant estimate of the channel response is obtained as a function of the number of reference pilots and their distribution in the time/frequency domain.

OFDM modulation is increasingly used in digital broadcasting because it is very well adapted to variations in the radio channel:echoes and Doppler. Engineers firstly study the characteristics of the radio channel that vary as a function of the emission frequency, the signal pass-band, and also for digital radio in the AM (DRM) bands, different propagation conditions between day and night and solar cycles, so as to choose the best adapted OFDM structure.

Receivers used for OFDM demodulation essentially use the channel response calculated from reference pilots. Therefore, the accuracy of this estimate depends on the proportion of reference pilots inserted in OFDM symbols.

A common phase error correction algorithm is known, but the treated error corresponds to the relative error between two successive OFDM symbols, the objective then being to correct phase errors due to defects in oscillators used in the receivers.

However, fast channel variations are observed, particularly for DRM and particularly when travelling in cars, which can cause temporary loss of service (partial or total).

In particular, known techniques for correcting phase variations between two successive OFDM symbols are based on calculation of the common phase error by differentiation between two successive symbols. Therefore, this correction is done before the channel estimate. For example, this is the case for the solution proposed by France Telecom and Telediffusion de France (TDF) in their French patent No. FR 2 768 278. However, this may not be sufficient, particularly in the case of DRM.

SUMMARY

An embodiment of the invention is directed to a method of estimating a propagation channel formed by successive symbols of a multi-carrier signal each comprising at least one reference pilot and a plurality of frequencies carrying data.

In one or more embodiments, such a method advantageously comprises at least one step to correct the reference pilot(s) as a function of a first estimate of a propagation channel, so as to create a second more precise second channel estimate.

This approach is based, for example, on the observation made by the inventors that currently known algorithms in solutions according to prior art do not use all information that can be extracted from reference pilots.

The article entitled "The effect of phase noise in COFDM" published in 1998 in the "EBU Technical Review" by J. Scott identifies the problem of the common phase error on an OFDM signal in reception, for example induced by oscillator phase noise. However this article according to prior art does not propose any correction to this problem.

Advantageously, this first estimating step for a propagation channel takes account of received pilots before they have been corrected.

In one or more embodiments, the correction step includes a step to calculate an amplitude and/or phase error vector for each of the reference pilots.

In one or more embodiments, the error vector calculation step includes averaging of a set of error vectors obtained on at least one symbol. For example, this averaging can correspond to an integration on error vectors obtained for each symbol, so as to eliminate any risk of introducing noise that could be generated due to the use of atypical pilots.

Advantageously, in one or more embodiments, averaging is calculated on each symbol.

Advantageously, in one or more embodiments, the set of error vectors only includes error vectors that satisfy at least one predetermined quality criterion.

In one or more embodiments, the calculation step for an amplitude and/or phase error vector comprises a preliminary rejection step for this calculation to reject pilots with an amplitude less than a first predetermined minimum average threshold and/or greater than a second predetermined maximum average threshold, so as to prevent any risk of introducing a bias into the calculation of the amplitude and/or phase error vector.

As a simple illustrative example, when making a conventional channel estimate, there are frequently amplitude and phase errors that are sufficiently large in percentage to make this channel unusable.

On the other hand, the method according to an embodiment of the invention makes it possible to demodulate all pilots to extract a common estimate applicable to the channel, by applying the channel estimate on the data themselves.

Thus, as the number of these pilots for the same symbol increases, the estimate of the errors will also be better and the additive gaussian white noise will be minimal. Pilots with a very low amplitude compared with the average on a symbol or with an amplitude that is too high (that can be considered as a parasite) are ignored in the operation.

Advantageously, in one or more embodiments, the second estimate includes an equalisation step that depends on the first channel estimate.

Advantageously, in one or more embodiments, the equalisation step is performed on all carrier frequencies of each symbol.

Also advantageously, in one or more embodiments, the equalisation step is followed by a step to calculate a pulse response of a propagation channel as a function of reference pilots equalised for refining synchronisation of receivers in time.

In one or more embodiments, the reference pilot correction step includes a division of these pilots by the first propagation channel estimate.

In one or more embodiments, the correction step of the reference pilots also includes a final correction step for all equalised useful carriers taking account of the average value obtained as a result of averaging.

The method according to an embodiment of the invention is used advantageously for correction of at least one phase and/or amplitude error common to two cells in the same OFDM (Orthogonal Frequency Division Multiplex) type symbol.

An embodiment of the invention also relates to a propagation channel estimating device formed of successive symbols of a multi-carrier signal each comprising at least one reference pilot, and a plurality of data carrier frequencies.

In one or more embodiments, such a device thus preferably includes means of correction of the reference pilot(s) as a function of a first estimate of the propagation channel, so as to output a second more precise channel estimate.

Other characteristics and advantages of one or more embodiments of the invention will become clearer after reading the following description of a preferred embodiment given as a simple illustrative and non-limitative example and the attached drawings.

DETAILED DESCRIPTION OF ILLUSTRATIVE EMBODIMENTS

An embodiment of the invention is intended to correct one or several phase and/or amplitude errors common to cells included within the same OFDM symbol, so as to optimise the estimate of an OFDM channel.

In more detail, so-called reference pilots in the OFDM signal are integrated to estimate the propagation channel. This estimate is used firstly to correct so-called data pilots with regard to the propagation channel and secondly to obtain the pulse response of the channel, the response then being used to refine the synchronisation of receivers in time.

For information, the use of reference pilots in digital sound radio broadcasting systems, particularly of the COFDM (Coding Orthogonal Frequency Division Multiplex) type is described in French patent No. FR 2 658 016, Feb. 6, 1990 concerning a digital data broadcasting method, particularly for high speed radio broadcasting to mobiles with time-frequency interlacing and coherent demodulation, and a corresponding receiver. In particular, such a method can be used to determine a phase and amplitude reference for each digital element by interpolation, and thus to achieve a coherent demodulation.

Therefore, with the method according to an embodiment of the invention, it is possible to determine the phase rotation of an OFDM symbol after channel correction. Such a technique provides a means of compensating for phase variations output from receiver oscillators, but it is also possible to determine amplitude variations common to a symbol. These two items of information can be used to monitor variations of the channel at the rate of symbols in the time domain.

According to a one or more preferred embodiments of the invention, the objective is to correct a phase and amplitude error common to cells included within the same OFDM symbol. This technique can be used to monitor channel variations at the rate of OFDM symbols, which is much better than what is possible with a conventional channel estimate due to the time and frequency distribution of reference pilots that are often limited in number so as to not reduce the throughput excessively.

Once the "coarse" time and frequency synchronisations have been set up, for example by correlation of guard intervals, the channel response can be obtained by interpolation on reference pilots. Once this estimate has been obtained, equalisation is applied to all reference pilots and OFDM symbol data. It then becomes possible to determine a residual error between sent pilots and received pilots after equalisation, at the reference pilots. This is usually due to additive gaussian white noise or possibly an error related to time and frequency interpolation limits, in other words channel estimating.

By integrating all vectors on a symbol, which is equivalent to averaging them, the result obtained is a global error vector. Confidence in elementary vectors is achieved from the channel estimate, this operation rejecting weak signals (embedded in noise) or parasite peaks.

Figure 6:
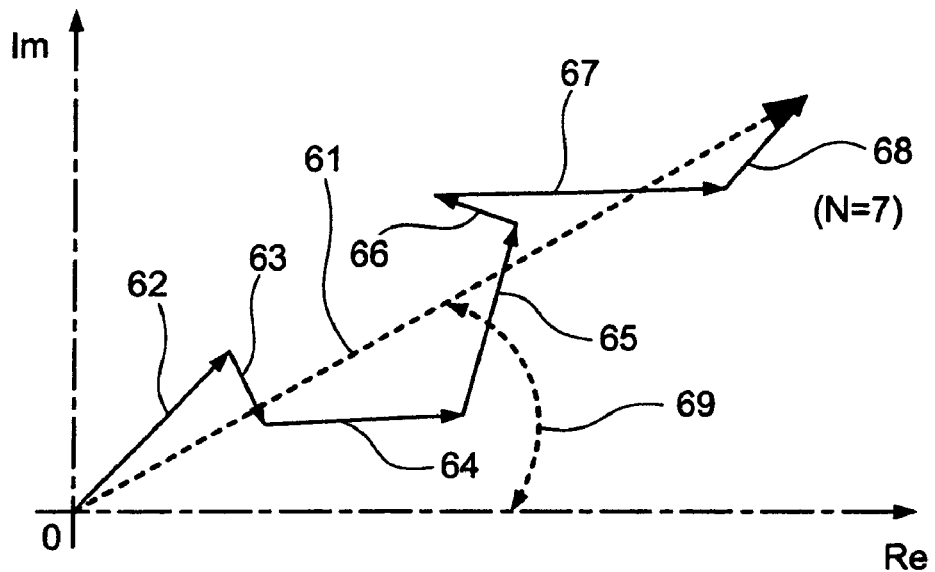
FIG. 6 gives an example of the determination of a global error vector starting from seven error vectors obtained for N=7 pilots respectively.

The phase of this vector corresponds to the common phase error "CPE" and the amplitude of this vector corresponds to the common amplitude error "CAE", both expressed by the mathematical formulas given below and shown in FIG. 6. This FIG. 6 gives an illustrative example of how to determine the global error vector 61 starting from seven error vectors (62, 63, 64, 65, 66, 67, 68) respectively obtained for N=7 pilots.

The common phase error "CPE" 69 is expressed as follows:

$$CPE = \text{angle}\left(\sum_{i=0}^{n-1} Pref_i\right)$$

and the common amplitude error "CAE" 61 as follows:

$$CAE = \frac{\sqrt{\left(\sum_{i=0}^{N-1} P_{ref_i}\right)^2}}{N}$$

where:

P $ref_i$: is the complex residual error on reference pilots i, where i is the index (from 0 to N−1) of the N reference pilots used;

N: is the variable defining the number of pilots in the calculation.

Similarly, if $H_1$ is the first response estimate of the channel before correction, weighting of this first channel estimate with the global error vector can give a new more precise channel estimate denoted $H_2$ that takes account of phase errors of receiver oscillators. This second more precise estimate also takes account of channel variations that could not normally be measured with techniques according to prior art and that are partly the reason for the improvement in the channel estimate applied to OFDM demodulation.

This second more precise channel estimate is expressed by means of the following mathematical formula:

$$h_2(n) = \frac{h_1(n) \cdot e(-j \cdot CPE)}{CAE}$$

where $h_1(n)$: is the channel response before correction.

It then becomes possible to evaluate the refined estimate value assigned to all cells equalised by the estimate by the following mathematical formula:

$$Y(n) = h_2^{-1}(n) * x(n)$$

where:

y(n) is the set of cells equalised by the estimate;

$h_2(n)$: is the channel response after correction by CPE and CAE;

x(n): is the set of cells associated with an OFDM symbol.

Figure 1:
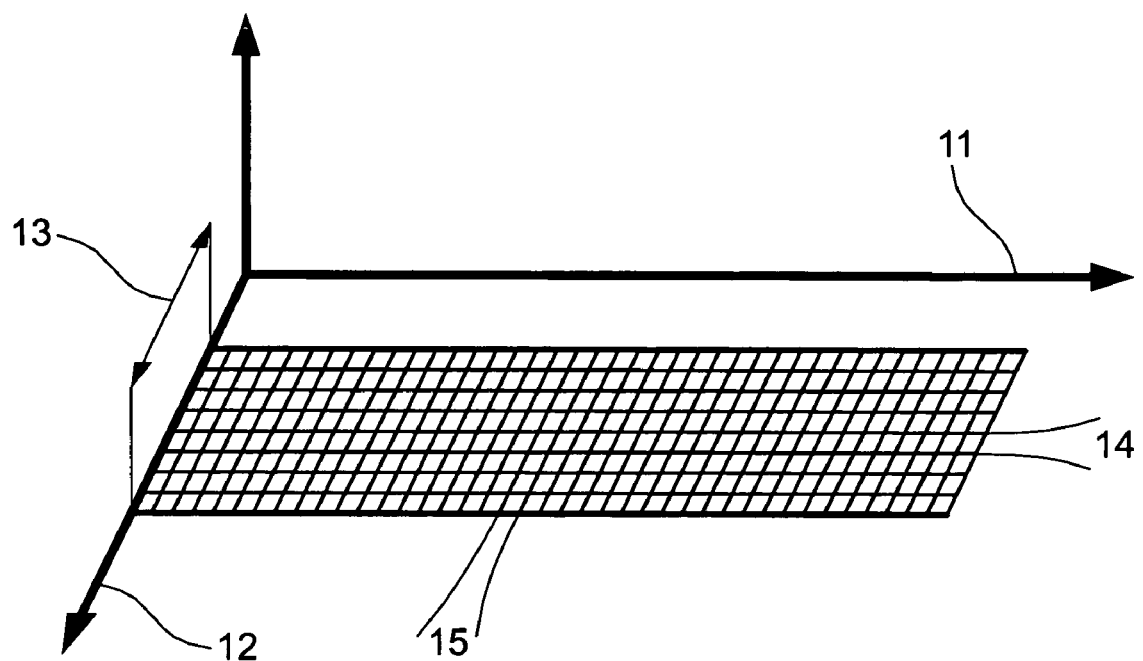
FIG. 1, already described in the preamble, is a time/frequency view of an OFDM channel broken down into cells, the channel then being composed of a sequence of frequency sub-bands and a sequence of time segments.
Figure 2:
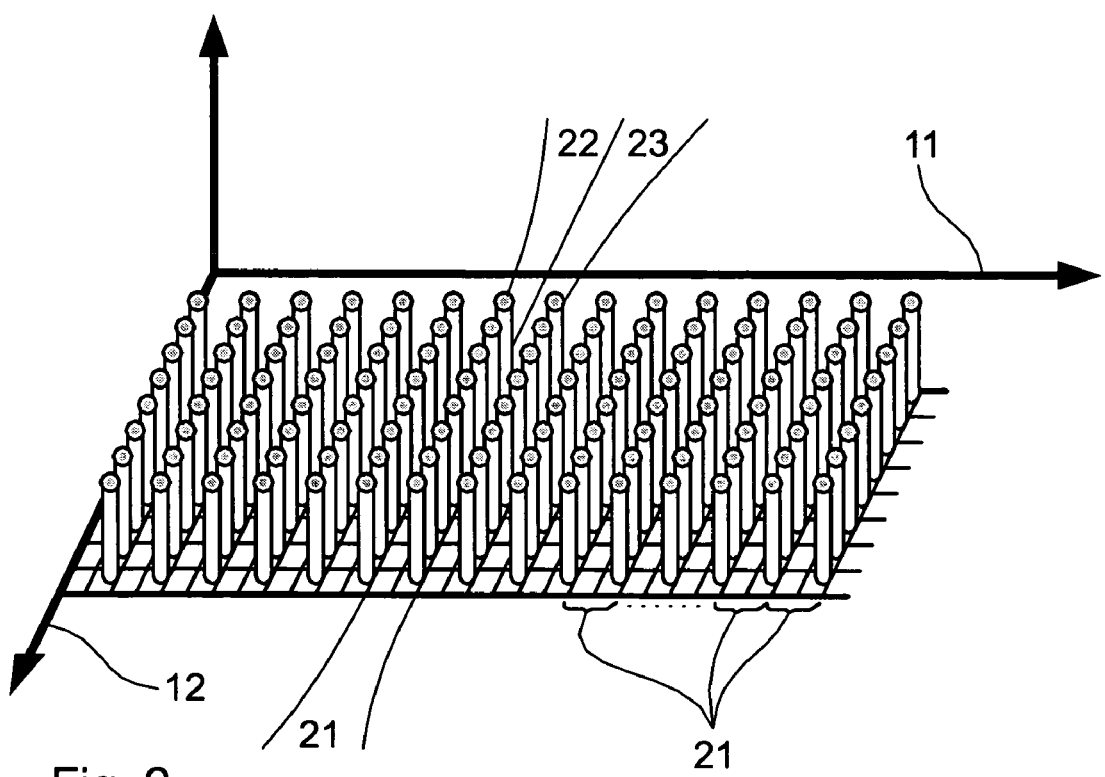
FIG. 2, also described above, presents a set of OFDM symbols.
Figures 3, 4:
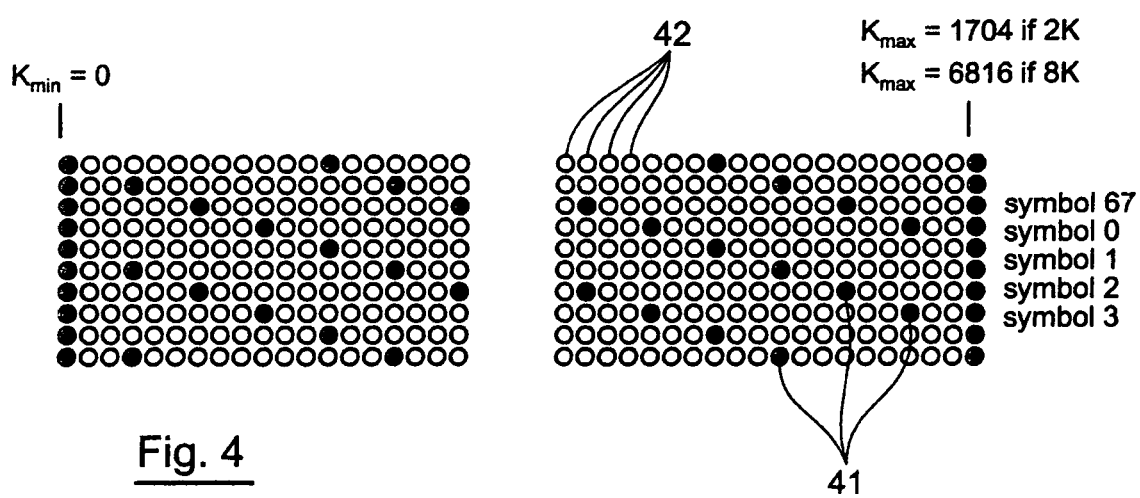
FIG. 3 shows an example of an OFDM structure in mode A of a set of DRM symbols.
FIG. 4 shows a second example of an OFDM structure, but for a set of DVB-T symbols.
Figure 5:
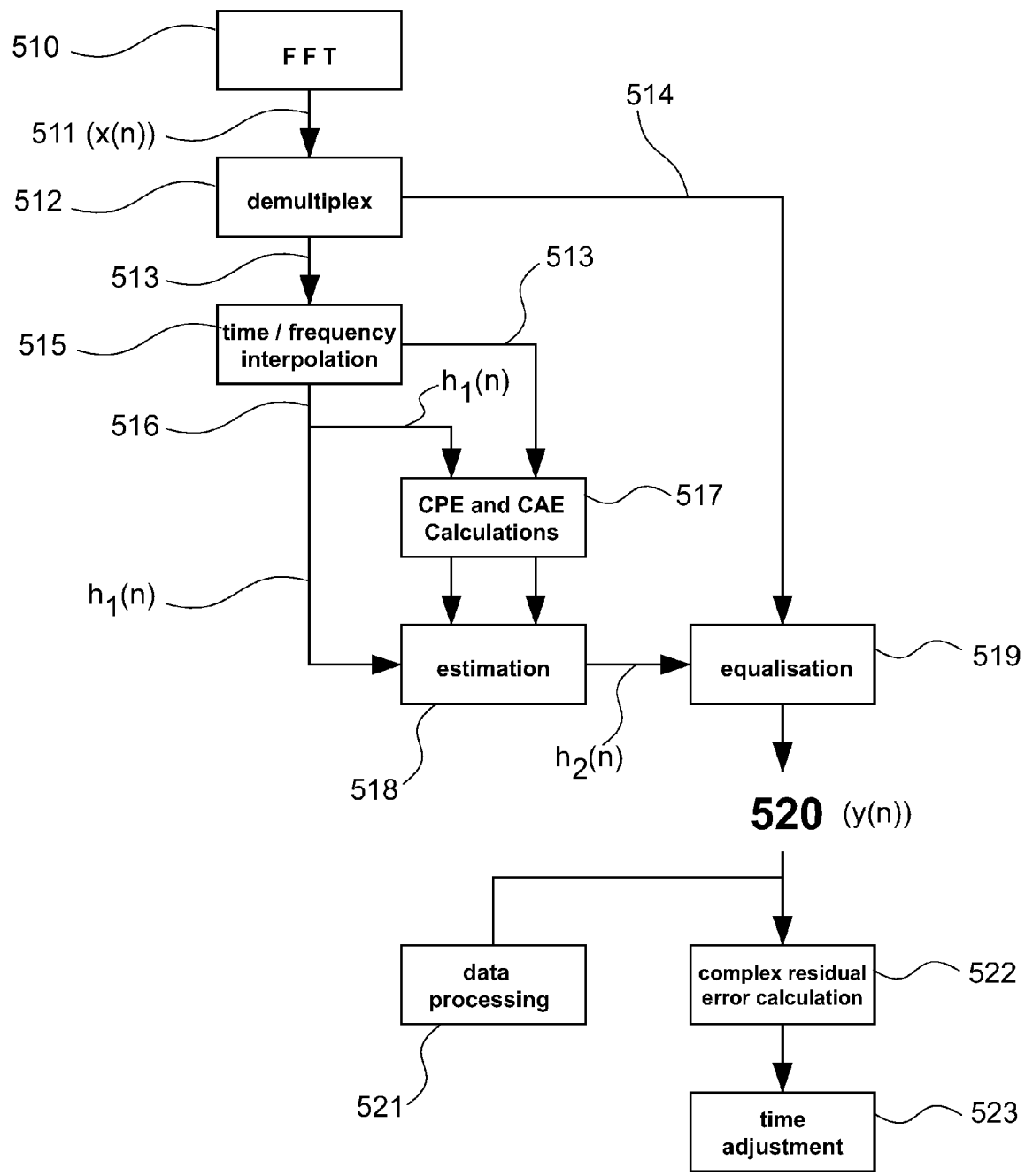
FIG. 5 is a diagrammatic description of the functional algorithm of a method according to an embodiment of the invention.

FIG. 5 shows a diagrammatic description of the functional algorithm described above for which the main steps are summarised as follows:

step 1: a Fast Fourier Transform 510 is applied to the received signal transferred in base band to identify the set x(n) 511 of cells associated with each of the OFDM symbols;

step 2: demultiplexing 512 of cells 511 then dissociates firstly the reference pilots 513 and secondly the data carriers 514;

step 3: a time/frequency interpolation 515 is carried out on all reference pilots 513 so as to obtain a first estimate $h_1(n)$ of the channel response 516 before correction;

step 4: the calculations 517 of common phase errors (ECP) and common amplitude errors (CAE) are then made from reference pilots 513, and the first estimate $h_1(n)$ of the channel response 516 before correction;

step 5: calculation of a second more precise estimate $h_2(n)$ 518 of the channel response after correction;

step 6: equalisation 519 of all cells 512 from the set of data carriers 514 and the result of the second estimate 518, so as to define the set 520 of equalised cells y(n) by the estimate;

step 7: application of the data processing 521 and calculation 522 of the complex residual error on corrected reference pilots i, so as to make the last time adjustment 523 on the corrected pilots.

Figure 7:
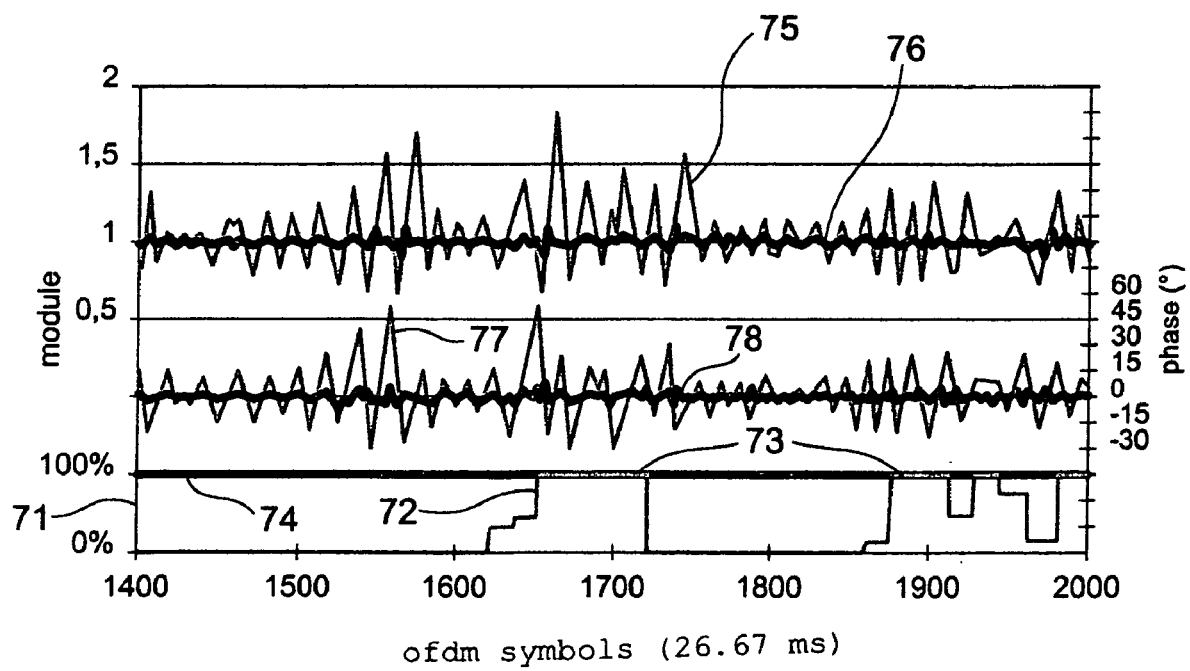
FIG. 7 gives an example of results obtained without application and with application of an algorithm according to an embodiment of the invention on an experimental broadcast of a DRM signal from a tower at a frequency of 26 MHz with mode A and demonstrates the residual error in the channel estimate before and after application of common error corrections.

FIG. 7 illustrates an example of the results obtained without application and with application of the algorithm according to an embodiment of the invention, on an experimental broadcast of a DRM signal from a tower at a frequency of 26 MHz in mode A (that has a reference pilot every 20 cells in frequency and every 5 cells in time). The audio service 71 is highly disturbed when moving near to the tower at 50 km/h: the uncorrected channel 72 comprises troughs and nodes 73, which recur more frequently than is possible with the selected OFDM mode. With the technique according to an embodiment of the invention, the audio service 71 after correction operates perfectly as illustrated by reference 74.

FIG. 7 also illustrates signals obtained for:

an uncorrected module 75;

a corrected module 76;

an uncorrected phase 77;

a corrected phase 78.

The method and device for estimating a propagation channel formed by successive symbols of a multi-carrier signal each comprising at least one reference pilot and a plurality of frequencies carrying data as proposed according to an embodiment of the invention may have a number of advantages, given in the following non-exhaustive list:

optimisation of the channel estimate in OFDM;

correction of data pilots with regard to the propagation channel;

possibility of obtaining a pulse response of the channel, which can be used to refine the time synchronisation of receivers;

application to OFDM reception in mobility of the type including DRM, DVB-T, etc.;

simplicity of use;

quality and relevance of results obtained in terms of correction;

speed of the solution and the algorithm.

A purpose of an embodiment of the invention is particularly to overcome the main disadvantages of prior art techniques.

More precisely, one purpose of an embodiment of the invention is to provide a method and a device for optimising the estimate of a propagation channel, particularly an OFDM channel, for example for DRM type applications.

In particular, another purpose of an embodiment of the invention is the attempt to reduce strong fading that can occur for example in the case of the DRM.

Another purpose of the invention is to provide a method and a device for correcting reference pilots as a function of a corresponding propagation channel.

Another purpose of an embodiment of the invention is to provide a method and an estimating device for refining synchronisation of receivers.

Yet another purpose of an embodiment of the invention is to provide a method and a device that are easy to use while remaining at reasonable cost.

Another purpose of an embodiment of the invention is to provide a method and a device for also correcting the problem of the common phase error on an OFDM signal in reception, for example induced by oscillator phase noise, complementary to the error on the amplitude common to OFDM symbols.

Although the present invention has been described with reference to one or more embodiments, workers skilled in the art will recognize that changes may be made in form and detail without departing from the spirit and scope of the invention.

The invention claimed is:

1. Process comprising:
   estimating a propagation channel formed by successive symbols of a multi-carrier signal, each symbol comprising at least one reference pilot and a plurality of frequencies carrying data, wherein estimating comprises:
   extracting said at least one reference pilot present in each of said symbols; and
   for each of said symbols:
      obtaining a first estimate of said propagation channel, by time/frequency interpolation on said extracted at least one reference pilot;
      independently correcting each of said at least one reference pilot, in phase and amplitude, and as a function of said first estimate, to output a corrected pilot with phase and amplitude correction, said correction step including a step to calculate an amplitude and phase error vector for each of said at least one reference pilot; and
      obtaining a second estimate of said propagation channel, by analysis of said corrected pilot.

2. Process for estimating a propagation channel according to claim 1, wherein said error vector calculation step includes averaging of a set of error vectors obtained on at least one symbol.

3. Process for estimating a propagation channel according to claim 2, wherein said averaging is calculated on each symbol.

4. Process for estimating a propagation channel according to claim 2, wherein said set of error vectors only includes error vectors that satisfy at least one predetermined quality criterion.

5. Process for estimating a propagation channel according to claim 1, wherein said calculation step for an amplitude and phase error vector comprises a preliminary step in which said pilots with an amplitude less than a first predetermined minimum average threshold and/or greater than a second predetermined maximum average threshold are rejected.

6. Process for estimating a propagation channel according to claim 1, wherein said second estimate includes an equalisation step that depends on the first estimate.

7. Process for estimating a propagation channel according to claim 6, wherein said equalisation step is performed on all carrier frequencies of each of said symbols.

8. Process for estimating a propagation channel according to claim 6, wherein the process comprises a step after said equalisation step to calculate a pulse response of the propagation channel as a function of the at least one reference pilot equalized by the equalization step, for refining synchronisation of receivers in time.

9. Process for estimating a propagation channel according to claim 1, wherein said the reference pilot correction step includes a division of these pilots by the first estimate.

10. Process for estimating a propagation channel according to claim 2, wherein said correction step of the at least one reference pilot also includes a final step to correct all equalised useful carriers taking account of an average value obtained as a result of said averaging.

11. Process for estimating a propagation channel according to claim 1, and further comprising using the process for correction of at least one phase and/or amplitude error common to two cells in a same OFDM (Orthogonal Frequency Division Multiplex) type symbol.

12. A device comprising:
   means for estimating a propagation channel formed of successive symbols of a multi-carrier signal, each symbol comprising at least one reference pilot, and a plurality of data carrier frequencies, the means for estimating comprising:
   means for extracting said at least one reference pilot present in each of said symbols; and
   means for obtaining estimates of said propagation channel, which comprises, for each of said symbols:
      making a first estimate of said propagation channel, by time/frequency interpolation on said extracted at least one reference pilot;
      independently correcting each of said at least one reference pilot, in phase and amplitude, as a function of said first estimate, to output at least one corrected pilot with phase and amplitude correction, said correction step including a step to calculate an amplitude and phase error vector for each of said at least one reference pilot; and
      making a second estimate of said propagation channel, by analysis of said at least one corrected pilot with phase and amplitude correction.

13. A device comprising:
   a channel estimator device configured to estimate a propagation channel formed of successive symbols of a multi-carrier signal, each symbol comprising at least one reference pilot, and a plurality of data carrier frequencies, the channel estimator device comprising:
   an extraction element, which extracts the at least one reference pilot present in each of said symbols; and
   a first estimation element, which makes a first estimate of the propagation channel, for each of said symbols, by time/frequency interpolation on the extracted at least one reference pilot;
   a correction element, which for each of said symbols independently corrects the at least one reference pilot, in phase and amplitude, as a function of the first estimate, to output at least one corrected pilot with phase and amplitude correction, said correction step including a step to calculate an amplitude and phase error vector for each of said at least one reference pilot; and
   a second estimation element, which for each of said symbols makes a second estimate of said propagation channel, by analysis of the at least one corrected pilot with phase and amplitude correction.

14. A process comprising:

estimating a propagation channel formed by successive symbols of a multi-carrier signal, each symbol comprising at least one reference pilot and a plurality of frequencies carrying data, wherein estimating comprises:

extracting said at least one reference pilot present in each of said symbols; and for each of said symbols:

obtaining a first estimate of said propagation channel, by time/frequency interpolation on said extracted at least one reference pilot;

independently correcting each of said at least one reference pilot, in phase and amplitude, and as a function of said first estimate, to output a corrected pilot with phase and amplitude correction, said correction step including a step to calculate an amplitude and phase error vector for each of said at least one reference pilot, which comprises a preliminary step in which said pilots with an amplitude less than a first predetermined minimum average threshold and/or greater than a second predetermined maximum average threshold are rejected; and obtaining a second estimate of said propagation channel, by analysis of said corrected pilot.

* * * * *